United States Patent
Hadden

(10) Patent No.: US 6,655,215 B2
(45) Date of Patent: Dec. 2, 2003

(54) INVERSE CORNER CUBE FOR NON-INTRUSIVE THREE AXIS VIBRATION MEASUREMENT

(75) Inventor: George D. Hadden, Saint Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 49 days.

(21) Appl. No.: 09/882,341

(22) Filed: Jun. 15, 2001

(65) Prior Publication Data

US 2002/0189361 A1 Dec. 19, 2002

(51) Int. Cl.[7] .................. G01N 29/04; G01C 1/00
(52) U.S. Cl. .................. 73/657; 73/1.82; 73/596; 356/152.3
(58) Field of Search .................. 73/657, 1.82, 596, 73/653, 655, 505, 504.14, 504.12, 64.43, 85; 356/152.3, 740, 459; 310/316, 321

(56) References Cited

U.S. PATENT DOCUMENTS

| | | | |
|---|---|---|---|
| 4,190,364 A | 2/1980 | Ljung et al. | 356/350 |
| 4,905,519 A | 3/1990 | Makowski | 73/657 |
| 5,127,735 A | 7/1992 | Pitt | 356/358 |
| 5,267,014 A | 11/1993 | Prenninger | 356/152 |
| 5,337,137 A * | 8/1994 | Ogawa et al. | 267/118 |
| 5,345,822 A * | 9/1994 | Nakamura et al. | 73/504.14 |
| 5,404,223 A * | 4/1995 | Hock | 356/468 |
| 5,455,476 A * | 10/1995 | Nakamura | 310/316.01 |
| 5,465,147 A * | 11/1995 | Swanson | 356/497 |
| 5,493,166 A * | 2/1996 | Kasanami et al. | 310/351 |
| 5,497,044 A * | 3/1996 | Nakamura et al. | 310/348 |
| 5,505,085 A * | 4/1996 | Kasanami et al. | 73/504.14 |
| 5,515,730 A * | 5/1996 | Manzouri | 356/619 |
| 5,552,883 A | 9/1996 | Busch-Vishniac et al. | 356/139.03 |
| 5,612,781 A * | 3/1997 | Ohtomo et al. | 356/152.2 |
| 5,635,647 A * | 6/1997 | Heinouchi | 73/662 |
| 5,774,211 A * | 6/1998 | Ohtomo et al. | 356/141.2 |
| 5,808,743 A | 9/1998 | Stephens et al. | 356/373 |
| 5,896,200 A * | 4/1999 | Shu | 356/614 |
| 5,970,792 A * | 10/1999 | Yamamoto | 73/504.14 |
| 6,010,223 A | 1/2000 | Gubela, Sr. | 359/529 |
| 6,046,766 A * | 4/2000 | Sakata | 348/148 |

FOREIGN PATENT DOCUMENTS

SU 1280335 A1 12/1986

\* cited by examiner

Primary Examiner—Hezron Williams
Assistant Examiner—Jacques Saint-Surin
(74) Attorney, Agent, or Firm—Kris T. Fredrick

(57) ABSTRACT

A non-intrusive apparatus and method for measuring vibration of an object along three axes. A vibration measurement device is provided which has three orthogonal right triangular panels forming a pyramidal shape having three 90° angled corners which meet at an apex, wherein each triangular panel has an outer mirrored surface. The device is attached to an object which is subjected to vibration, such that the apex of the device points in a direction away from the object. A beam of light is directed onto the apex of the device such that a portion of the light is reflected off of each mirrored surface, sending reflected light in three directions to three different light sensors. The magnitude of vibration of the object can then be determined in each of three orthogonal directions, along three axes, by measuring the difference in movements of position between the reflected light and a reference beam.

15 Claims, 3 Drawing Sheets

INVERSE CORNER CUBE FOR NON-INTRUSIVE THREE AXIS VIBRATION MEASUREMENT

BACKGROUND OF THE INVENTION

1. Field of the Invention

The present invention relates to vibration sensing. More particularly, the invention relates to a non-intrusive apparatus and method for sensing and measuring vibrations of an object along three orthogonal axes.

2. Description of the Related Art

Vibration measurement systems are known in the art. Vibration sensing devices are often used to detect vibration levels of objects or machinery, particularly rotating machinery such as centrifugal pumps and the like. Changes in vibration levels are often used to detect whether or not such machinery is running properly and, if not, to determine the nature of the problem.

Conventional vibration measurement devices often utilize instruments which determine the motion of a vibrating body by placing a seismic mass, which is mounted on springs, on the body and by measuring the relative displacements of the body and the mass. The measurement is usually made by resistance or capacitance probes. A device which contains these components is called an accelerometer. The accuracy of the measurements of the motions is dependent upon the sensitivity of the measurement technique. One such example is shown in U.S. Pat. No. 4,051,718 which concerns an apparatus for measuring the velocity of low frequency mechanical vibrations. Thus apparatus comprises two springs between which a vibratable mass is secured, two electric coils mechanically coupled to the mass, a permanent magnet core in each coil which is stationary relative to its associated coil, one coil being a measuring coil while the other is a feedback coil; and a current generator having a control input to which the measuring coil is connected while the feedback coil is connected to the generator output, the connection polarities being so selected as to produce negative feedback. Unfortunately, even the most sensitive commercial accelerometers are only able to resolve accelerations of 2 to 3 microgravities ($\mu G$) over a dynamic range of 0 to 100 Hertz. Such sensitivity does not enable sufficiently precise measurements on the optical table to be made and, therefore, the ability to obtain test results utilizing the optical table were reduced to that degree by which undesired vibrations thereon could be determined.

U.S. Pat. No. 4,905,519 describes a vibration sensor having a mirror bonded to a thin metal sheet. The sheet is clamped to the mirror to allow vibration of the mirror along a line which is perpendicular to the plane of the mirror. This vibrating beam and mirror assembly is clamped to a large base, which is placed on an optical table. The unidirectional motion of the mirror relative to the vibrating base and the optical table is measured in order to derive the amplitude and frequency of the vibrations.

U.S. Pat. No. 5,267,014 discloses a non-contacting device for measurement of the orientation in space of a movable object. The device comprises a retro-reflector attached to an object, which retro-reflector has three mutually orthogonal reflective surfaces. A light source projects a beam of light onto a reference mark on the retro-reflector. The beam of light is then reflected back toward the light source, where a semi-transparent mirror deflects a portion of the reflected light beam to a plane where a picture with a pattern caused by the reference mark is formed. Information provided by this picture can be used to determine the orientation in space of the movable object.

U.S. Pat. No. 5,808,743 teaches a laser sensor for measuring target position, velocity, and vibration based on optical feedback induced fluctuations in the operating frequency of a diode laser. The sensor comprises a diode laser which is directed onto a target. The target scatters a small fraction of light back into a laser diode cavity. The optical feedback alters the operating frequency of the laser. A small portion of the light is diverted to an optical frequency discriminator where changes in the laser operating frequency are analyzed and an electronic signal is generated which can be used to determine target position, velocity, and vibration frequency.

U.S. Pat. No. 5,552,883 teaches a noncontact position measurement system using optical sensors. Reflective optical targets are provided on a target object whose position is to be sensed. Light beams are directed toward the optical targets, producing reflected beams. By knowing the position of each projected and reflected beam and the relative locations of the optical sensors and emitters, the set of beam movements with respect to a sensor may be calculated into changes of position of the target along three nonparallel axes.

U.S. Pat. No. 4,125,025 discloses an instrument for measuring the amplitude of vibration of a vibrating object with a high degree of sensitivity. The instrument consists of a first optical system for periodically projecting the image of a grating onto a vibrating object and a second optical system having an optical axis intersecting that of the first optical system in the vicinity of the object, for sharing the image projected on and reflected from the object and recording the shared image on a photographic film. The measurement of the amplitude is obtained in the form of a moire pattern.

Other vibration sensing devices use strain gauges or piezoelectric devices. Strain gauge type vibration sensors employ an electrical resistance that varies with the magnitude of a vibration and converts an electrical resistance change to a corresponding analog voltage output to produce a vibration detection signal. Similarly, piezoelectric devices employ quartz crystals that convert an induced strain to a corresponding analog voltage output. In both types of vibration sensing devices, the changes in the electrical resistance or piezoelectric response provided by the device in response to the vibrations are extremely small, and complicated electrical circuitry must be provided. This circuitry typically includes complex wiring between the object being measured and the sensor, and between the sensor and the device accepting the sensed data. This wiring is costly and is often destructive to the physical integrity of the object being measured.

It would therefore be desirable to devise a non-intrusive method for measuring vibrations of objects. The present invention provides a solution to this problem. According to the invention, a vibration measurement device is provided which has three orthogonal right triangular panels which are congruent to each other, forming a pyramid shape wherein the three 90° angle corners meet at an apex and wherein each triangular panel of the pyramid shape has an outer mirrored surface. The device is preferably attached to an object which is subjected to vibration, such that the apex of the device points in a direction away from the object, and toward a beam splitter. A beam of light may then be projected from a laser, and onto the beam splitter which splits the beam of laser light into one incident beam segment and three reference beam segments. Each of the reference beam segments are directed onto one of three laser light sensors. The incident beam segment is directed onto the apex of the vibration measurement device such that a portion of the incident beam segment is reflected from the mirrored surface of each of the three triangular panels. Each reflected portion of the incident beam segment is then received by a laser light sensor, which is capable of receiving and detecting changes of position of reflected laser light from one of the triangular panels. A light measurement implement is attached to each of the light sensors to measure movements of position of the reflected portions of the incident beam segment on each of the laser light sensors, and compare these movements of position with the reference beam segment directed to the corresponding sensor. The magnitude of vibration of the object can then be determined in each of three orthogonal directions, along three axes, by measuring the difference in movements of position between the reference beam segments and the reflected portions of the incident beam segment.

SUMMARY OF THE INVENTION

The invention provides a vibration measurement apparatus which comprises:
  a) a vibration measurement device which comprises three triangular panels which are congruent to each other and have the shape of an isosceles right triangle having a 90° angled corner between two equal length edges, each panel being attached along one of its equal length edges to an equal length edge of one of the other panels and being attached along another of its equal length edges to an equal length edge of another panel, forming an orthogonal pyramidal configuration such that the three 90° angle corners meet at an apex, and wherein each triangular panel of the pyramidal configuration has an outer mirrored surface;
  b) three laser light sensors, each positioned for receiving and detecting changes of position of reflected laser light from one of the triangular panels;
  c) a laser capable of projecting a beam of laser light onto a beam splitter;
  d) a beam splitter capable of receiving a beam of laser light from the laser; splitting the beam of laser light into an incident beam segment and three reference beam segments; directing one of each of the reference beam segments onto one of each of the laser light sensors; directing the incident beam segment onto the apex of the vibration measurement device and reflecting a portion of the incident beam segment from the mirrored surface of each of the three triangular panels onto one of each of the laser light sensors; and
  e) a light measurement implement attached to each of the light sensors, which light measurement implement is capable of measuring movements of position of the reflected portions of the incident beam segments on each of the laser light sensors and comparing said movements of position with the reference beam segment directed to the corresponding sensor.

The invention also provides a method for measuring vibrations of an object which comprises:
  i) providing a vibration measurement apparatus which comprises:
     a) a vibration measurement device which comprises three triangular panels which are congruent to each other and have the shape of an isosceles right triangle having a 90° angled corner between two equal length edges, each panel being attached along one of its equal length edges to an equal length edge of one of the other panels and being attached along another of its equal length edges to an equal length edge of another panel, forming an orthogonal pyramidal configuration such that the three 90° angle corners meet at an apex, and wherein each triangular panel of the pyramidal configuration has an outer mirrored surface;
     b) three laser light sensors, each positioned for receiving and detecting changes of position of reflected laser light from one of the triangular panels;
     c) a laser capable of projecting a beam of laser light onto a beam splitter;
     d) a beam splitter capable of receiving a beam of laser light from the laser; splitting the beam of laser light into an incident beam segment and three reference beam segments; directing one of each of the reference beam segments onto one of each of the laser light sensors; directing the incident beam segment onto the apex of the vibration measurement device and reflecting a portion of the incident beam segment from the mirrored surface of each of the three triangular panels onto one of each of the laser light sensors; and
     e) a light measurement implement attached to each of the light sensors, which light measurement implement is capable of measuring movements of position of the reflected portions of the incident beam segment on each of the laser light sensors and comparing said movements of position with the reference beam segment directed to the corresponding sensor;
  ii) attaching the vibration measurement device to an object which is subjected to vibration, such that the apex of the device points in a direction away from the object and in a direction towards the beam splitter;
  iii) projecting a beam of laser light from the laser onto the beam splitter such that the beam splitter splits the beam of laser light into an incident beam segment and three reference beam segments, directs one of each of the reference beam segments onto one of each of the laser light sensors, and directs the incident beam segment onto the apex of the vibration measurement device such that a portion of the incident beam segment is reflected from the mirrored surface of each of the three triangular panels onto one of each of the laser light sensors;
  iv) receiving the reflected portions of the incident beam segment with each of the laser light sensors, measuring movements of position of the reflected portions of the incident beam segment on each of the laser light sensors, and comparing said movements of position with the reference beam segment directed to the corresponding sensor; and
  v) determining the magnitude of vibration of the object in each of three orthogonal directions by measuring the difference in movements of position between the reference beam segments and the reflected portions of the incident beam segment.

The invention further provides a vibration measurement device which comprises three triangular panels which are congruent to each other and have the shape of an isosceles right triangle having a 90° angled corner between two equal length edges, each panel being attached along one of its equal length edges to an equal length edge of one of the other panels and being attached along another of its equal length edges to an equal length edge of another panel, forming an orthogonal pyramidal configuration such that the three 90° angle corners meet at an apex, and wherein each triangular panel of the pyramidal configuration has an outer mirrored surface.

DETAILED DESCRIPTION OF THE PREFERRED EMBODIMENT

Figure 1:
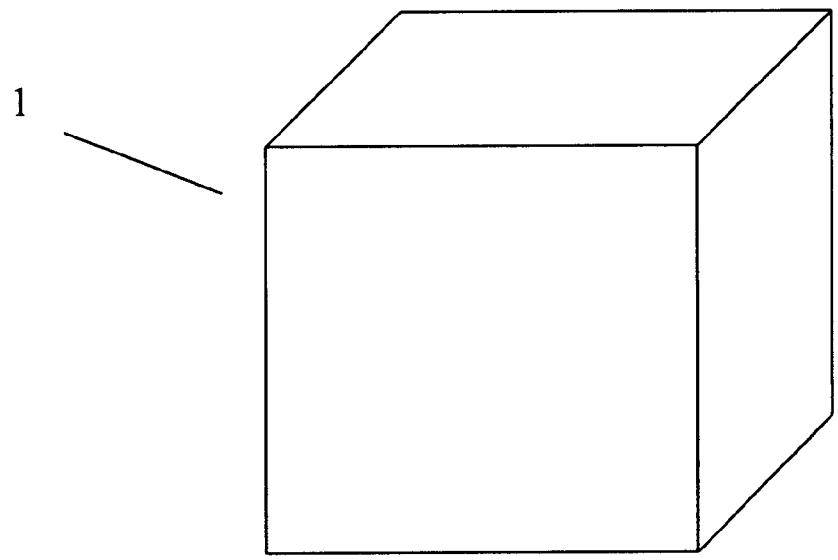
FIG. 1 shows a perspective view of an object whose vibrations are to be measured.

A vibration measurement apparatus of the invention comprises a vibration measurement device, three laser light sensors, a laser, a beam splitter, and a light measurement implement. This vibration measurement apparatus can be used to measure the vibrations of an object such as that shown in FIG. 1.

Figure 2:
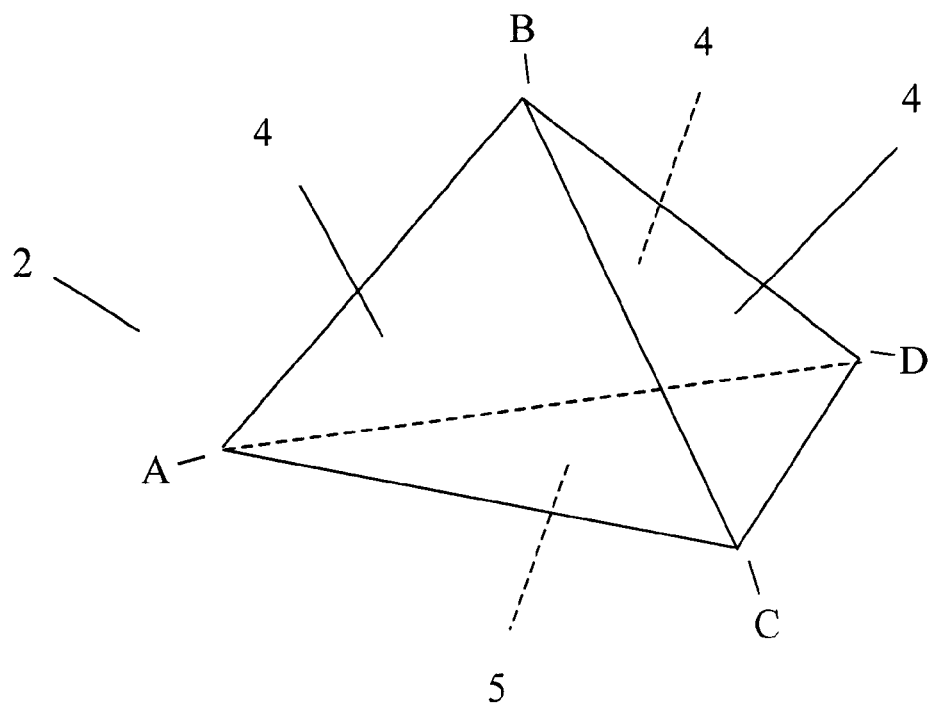
FIG. 2 shows a perspective view of a vibration measurement device of the invention.

As shown in FIG. 2, a vibration measurement device 2 is in the form of an orthogonal pyramid, or corner of a cube. The device comprises three congruent triangular panels 4 each having the shape of an isosceles right triangle having a 90° angled corner between two edges, preferably having equal length edges. In FIG. 2, these 90° angles are shown as angles ABC, CBD, and ABD. In a most preferred embodiment, the triangular panels 4 each have the shape of an isosceles right triangle. Each triangular panel 4 is preferably attached along one of its equal length edges to an equal length edge of one of the other panels, and attached along its other equal length edge to an equal length edge of a second panel. The other two panels are attached to each other along each of their other equal length edges. The panels 4 are attached such that the three 90° angle corners, ABC, CBD, and ABD, meet at an apex, B, thus forming an orthogonal pyramidal configuration having three side panels 4 defining a base 5. The base 5 may be open or closed. Optionally, one or more edges of any of the panels of the device may be extended farther than the other edges of that panel, so long as the three panels remain orthogonally oriented with respect to each other. Thus, triangles of various shapes and sizes may be used to form the orthogonal pyramid of the device. Optionally, a bottom edge of each panel 4 of the device 2 may be irregularly shaped to conform to the contour of an object 1, shown in FIG. 1, whose vibrations are to be monitored.

Each triangular panel 4 of the pyramidal configuration preferably comprises an outer mirrored surface which is capable of reflecting beams of laser light. The mirrored surfaces may comprise a metal or any other reflective material. Most preferably, the mirrored surfaces comprise metal.

Figure 3:
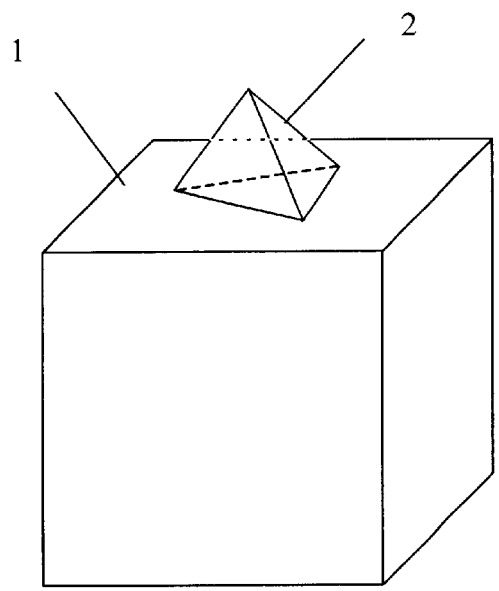
FIG. 3 shows a perspective view of a vibration measurement device of the invention attached to an object whose vibrations are to be measured.
Figure 4:
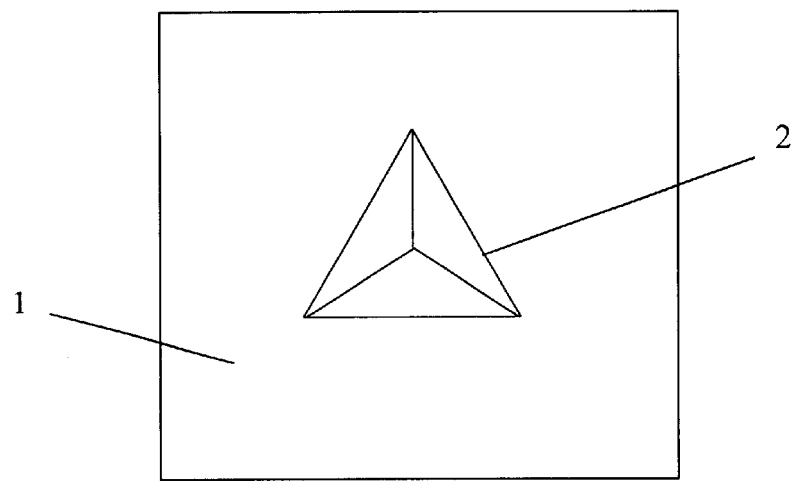
FIG. 4 shows a top view of a vibration measurement device of the invention attached to an object whose vibrations are to be measured.

As shown in FIGS. 3 and 4, the vibration measurement device 2 is preferably attached to an object 1 whose vibrations are to be measured or monitored. The device 2 may be attached by any conventional means such as gluing and the like. The device 2 is preferably attached to the object 1 such that the apex B of the device points in a direction away from the object 1 and in a direction towards a beam splitter, as described below.

Figure 5:
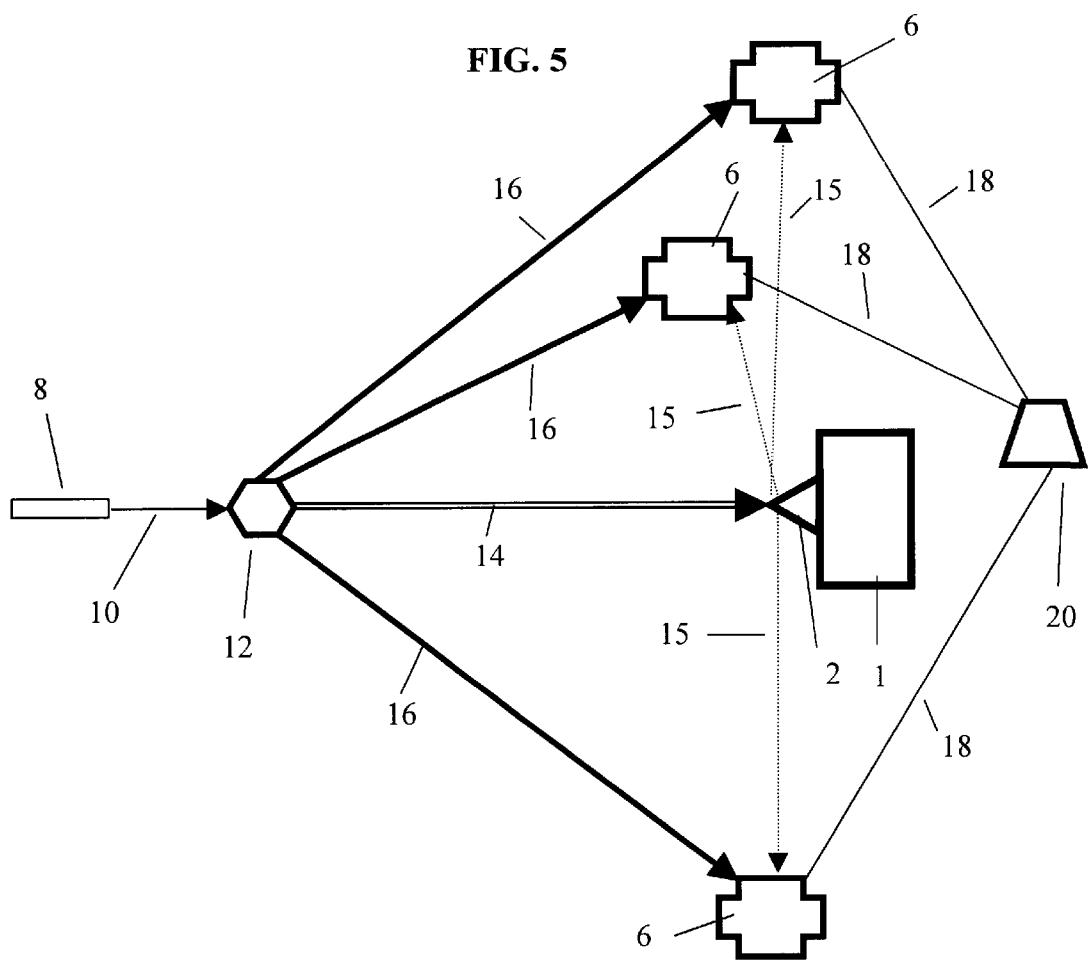
FIG. 5 shows a schematic diagram of a vibration measurement apparatus of the invention.

As shown in FIG. 5, a laser 8 serves to project a beam of laser light 10 onto a beam splitter 12. The beam of laser light 10 may have any frequency and wavelength deemed suitable by those skilled in the art. Suitable lasers for use according to the present invention nonexclusively include those available commercially from Edmund Scientific's Industrial Optics Division, Barrington, N.J. USA.

As shown in FIG. 5, beam splitter 12 receives a beam of laser light 10 from the laser source 8 and splits the beam 10 into a plurality of beam segments. In one preferred embodiment, four beam segments are formed. The beam segments preferably comprise one incident beam segment 14 and three reference beam segments 16. The beam splitter 12 preferably directs one of each of the reference beam segments 16 onto one of three sensors 6, described below. The beam splitter 12 also directs the incident beam segment 14 onto the apex of the vibration measurement device 2. This causes a portion of the incident beam segment 14 to be reflected from the mirrored surface of each of the three triangular panels 4, forming three reflected portions 15 of the incident beam segment, which are each directed to one of each of the sensors 6. Suitable beam splitters for use according to the present invention nonexclusively include half silvered mirrors, known to those skilled in the art, and various other beam splitters such as those commercially available from Edmund Scientific's Industrial Optics Division, Barrington, N.J. USA.

Three laser light sensors 6 are present, each of which serves to receive and detect changes of position of the reflected portions 15 of the incident beam segment from one of the triangular panels 4 of the vibration measurement device 2. The light sensors 6 may use analog or digital systems to detect such movements of position. Suitable light sensors for use according to the present invention nonexclusively include position sensitive photodiodes such as those available commercially from On-Trak Photonics, Inc. of Lake Forest, Calif., USA.

A light measurement implement 20 is attached to each of the light sensors 6 via an implement attachment means 18. Preferably, the implement attachment means 18 comprises a wire, a fiber optic cable or the like. The light measurement implement 20 measures movements of position of the reflected portions 15 of the incident beam segment on each of the laser light sensors 6. The light measurement implement 20 may use analog or digital systems to measure such movements of position. The implement 20 is also capable of comparing said movements of position with the reference beam segments 16 directed to each corresponding sensor. Suitable light measurement implements for use according to the present invention nonexclusively include computers, data processors, or other electronic devices known to those skilled in the art as being capable of measuring movements of position of light beams.

The magnitude of vibration of the object can then be determined in each of three orthogonal directions by measuring the difference in movements of position between each of the reference beam segments 16 and the reflected portions 15 of the incident beam segment.

The following non-limiting examples serve to illustrate the invention. It will be appreciated that variations in proportions and alternatives in elements of the components of the invention will be apparent to those skilled in the art and are within the scope of the present invention.

EXAMPLE 1

An orthogonal pyramid having an outer mirrored surface comprising three triangular panels, is glued to an object which is subjected to vibration. The pyramid is attached to the object such that the pyramid's apex points in a direction away from the object and towards a beam splitter which comprises a half silvered mirror. A beam of light is projected from a laser onto the half silvered mirror such that the beam of light is split into one incident beam segment and three reference beam segments. Each of the reference beam segments are directed onto one of each of three laser light sensors, and the incident beam segment is directed onto the apex of the orthogonal pyramid. As the incident beam segment hits the apex, a portion of the incident beam segment is reflected from the mirrored surface of each of the three triangular panels, and onto one of each of the laser light sensors. A light measurement implement, attached to each of the light sensors via fiber optic cables, is used to determine the magnitude of vibration of the object in each of three orthogonal directions by measuring the difference in movements of position between the reflected portions of the incident beam segment received from the pyramid, and the reference beam segment directed to each corresponding sensor from the half silvered mirror.

What is claimed is:

1. A vibration measurement apparatus which comprises:
   a) a vibration measurement device which comprises three triangular panels which are congruent to each other and have the shape of an isosceles right triangle having a 90° angled corner between two equal length edges, each panel being attached along one of its equal length edges to an equal length edge of one of the other panels and being attached along another of its equal length edges to an equal length edge of another panel, forming an orthogonal pyramidal configuration such that the three 90° angle corners meet at an apex, and wherein each triangular panel of the pyramidal configuration has an outer mirrored surface;
   b) three laser light sensors, each positioned for receiving and detecting changes of position of reflected laser light from one of the triangular panels;
   c) a laser capable of projecting a beam of laser light onto a beam splitter;
   d) a beam splitter capable of receiving a beam of laser light from the laser; splitting the beam of laser light into an incident beam segment and three reference beam segments; directing one of each of the reference beam segments onto one of each of the laser light sensors; directing the incident beam segment onto the apex of the vibration measurement device and reflecting a portion of the incident beam segment from the mirrored surface of each of the three triangular panels onto one of each of the laser light sensors; and
   e) a light measurement implement attached to each of the light sensors, which light measurement implement is capable of measuring movements of position of the reflected portions of the incident beam segments on each of the laser light sensors and comparing said movements of position with the reference beam segment directed to the corresponding sensor.

2. The apparatus of claim 1 wherein each of the triangular panels has the shape of an isosceles right triangle.

3. The apparatus of claim 1 wherein the outer mirrored surfaces of the triangular panels comprise a metal.

4. The apparatus of claim 1 wherein the vibration measurement device has an open base.

5. The apparatus of claim 1 wherein the vibration measurement device has a closed base.

6. The apparatus of claim 1 wherein the light measurement implement is attached to each of the light sensors via fiber optic cables.

7. The apparatus of claim 1 wherein the beam splitter comprises a half silvered mirror.

8. A method for measuring vibrations of an object which comprises:
   i) providing a vibration measurement apparatus which comprises:
      a) a vibration measurement device which comprises three triangular panels which are congruent to each other and have the shape of an isosceles right triangle having a 90° angled corner between two equal length edges, each panel being attached along one of its equal length edges to an equal length edge of one of the other panels and being attached along another of its equal length edges to an equal length edge of another panel, forming an orthogonal pyramidal configuration such that the three 90° angle corners meet at an apex, and wherein each triangular panel of the pyramidal configuration has an outer mirrored surface;
      b) three laser light sensors, each positioned for receiving and detecting changes of position of reflected laser light from one of the triangular panels;
      c) a laser capable of projecting a beam of laser light onto a beam splitter;
      d) a beam splitter capable of receiving a beam of laser light from the laser; splitting the beam of laser light into an incident beam segment and three reference beam segments; directing one of each of the reference beam segments onto one of each of the laser light sensors; directing the incident beam segment onto the apex of the vibration measurement device and reflecting a portion of the incident beam segment from the mirrored surface of each of the three triangular panels onto one of each of the laser light sensors; and
      e) a light measurement implement attached to each of the light sensors, which light measurement implement is capable of measuring movements of position of the reflected portions of the incident beam segment on each of the laser light sensors and comparing said movements of position with the reference beam segment directed to the corresponding sensor;
   ii) attaching the vibration measurement device to an object which is subjected to vibration, such that the apex of the device points in a direction away from the object and in a direction towards the beam splitter;
   iii) projecting a beam of laser light from the laser onto the beam splitter such that the beam splitter splits the beam of laser light into an incident beam segment and three reference beam segments, directs one of each of the reference beam segments onto one of each of the laser light sensors, and directs the incident beam segment onto the apex of the vibration measurement device such that a portion of the incident beam segment is reflected from the mirrored surface of each of the three triangular panels onto one of each of the laser light sensors;
   iv) receiving the reflected portions of the incident beam segment with each of the laser light sensors, measuring movements of position of the reflected portions of the incident beam segment on each of the laser light sensors, and comparing said movements of position with the reference beam segment directed to the corresponding sensor; and v) determining the magnitude of vibration of the object in each of three orthogonal directions by measuring the difference in movements of position between the reference beam segments and the reflected portions of the incident beam segment.

9. The method of claim 8 wherein each of the triangular panels has the shape of an isosceles right triangle.

10. The method of claim 8 wherein the light measurement implement is attached to each of the light sensors via fiber optic cables.

11. The method of claim 8 wherein the vibration measurement device is glued to the object which is subjected to vibration.

12. The method of claim 8 wherein the vibration measurement device is clamped to the object which is subjected to vibration.

13. The method of claim 8 wherein the outer mirrored surfaces of the triangular panels comprise a metal.

14. The method of claim 8 wherein the beam splitter comprises a half silvered mirror.

15. The method of claim 8 wherein the light sensors comprise position sensitive photodiodes.

* * * * *